(12) United States Patent
Pfleghar et al.

(10) Patent No.: US 8,404,323 B2
(45) Date of Patent: Mar. 26, 2013

(54) IMPACT-RESISTANT MODIFIED POLYAMIDE MOULDING COMPOUND AND CONTAINER FORMED THEREFROM

(75) Inventors: Mark Pfleghar, Domat/Ems (CH); Gerhard Zaschke, Bonaduz (CH); Roland Treutlein, Pirk (DE); Ulrich Presenz, Trin (CH)

(73) Assignee: EMS-Patent AG, Domat/Ems (CH)

( * ) Notice: Subject to any disclaimer, the term of this patent is extended or adjusted under 35 U.S.C. 154(b) by 259 days.

(21) Appl. No.: 13/045,682

(22) Filed: Mar. 11, 2011

(65) Prior Publication Data

US 2011/0220667 A1    Sep. 15, 2011

(30) Foreign Application Priority Data

Mar. 12, 2010    (EP) .................................. 10002658

(51) Int. Cl.
- *B32B 1/08* (2006.01)
- *B32B 27/34* (2006.01)
- *B32B 27/18* (2006.01)

(52) U.S. Cl. ................... 428/35.7; 428/36.8; 428/474.4; 425/183; 425/184

(58) Field of Classification Search ................. 428/35.7, 428/36.8, 474.4; 525/184, 183
See application file for complete search history.

(56) References Cited

U.S. PATENT DOCUMENTS

| | | | |
|---|---|---|---|
| 2,516,585 A | 7/1950 | Pease | |
| 4,036,811 A | 7/1977 | Noetzel et al. | |
| 4,076,664 A | 2/1978 | Pagilagan | |
| 4,212,777 A | 7/1980 | Goletto | |
| 4,345,066 A | 8/1982 | Rüter | |
| 4,413,921 A | 11/1983 | Fotiu et al. | |
| 4,603,166 A | 7/1986 | Poppe et al. | |
| 4,680,379 A | 7/1987 | Coquard et al. | |
| 4,731,421 A | 3/1988 | Hoppe et al. | |
| 4,826,951 A | 5/1989 | Coquard et al. | |
| 4,831,108 A | 5/1989 | Richardson et al. | |
| 4,847,356 A | 7/1989 | Hoppe et al. | |
| 5,071,924 A | 12/1991 | Koch et al. | |
| 5,081,222 A | 1/1992 | Reimann et al. | |
| 5,098,940 A | 3/1992 | Brooks | |
| 5,177,177 A | 1/1993 | Thullen et al. | |
| 5,177,178 A | 1/1993 | Thullen et al. | |
| 5,191,060 A | 3/1993 | Akkapeddi et al. | |
| RE34,447 E | 11/1993 | Poppe et al. | |
| 5,278,231 A | 1/1994 | Chundury | |
| 5,302,691 A | 4/1994 | Soelch | |
| 5,310,860 A | 5/1994 | Maj et al. | |
| 5,342,862 A * | 8/1994 | Reich ............................ | 523/125 |
| 5,422,418 A | 6/1995 | Maj et al. | |
| 5,480,945 A | 1/1996 | Vicik | |
| 5,560,398 A | 10/1996 | Pfleger | |
| 5,612,446 A * | 3/1997 | Presenz et al. ................ | 528/310 |
| 5,674,973 A | 10/1997 | Pipper et al. | |
| 5,684,120 A | 11/1997 | Torre | |
| 5,686,192 A * | 11/1997 | Presenz et al. ............. | 428/474.4 |
| 5,688,901 A | 11/1997 | Fisch et al. | |
| 5,708,125 A | 1/1998 | Liedloff et al. | |
| 5,773,556 A | 6/1998 | Kleiner et al. | |
| 5,786,086 A | 7/1998 | Frihart et al. | |
| 5,807,972 A | 9/1998 | Liedloff et al. | |
| 5,917,004 A | 6/1999 | Liedloff et al. | |
| 5,957,607 A | 9/1999 | Tsai | |
| 6,204,355 B1 | 3/2001 | Dalla Torre et al. | |
| 6,255,371 B1 | 7/2001 | Schlosser et al. | |
| 6,270,560 B1 | 8/2001 | Kleiner et al. | |
| 6,291,633 B1 | 9/2001 | Nakamura | |
| 6,303,741 B1 * | 10/2001 | Tanaka ........................... | 528/332 |
| 6,319,986 B1 | 11/2001 | Amimoto et al. | |
| 6,365,071 B1 | 4/2002 | Jenewein et al. | |
| 6,547,992 B1 | 4/2003 | Schlosser et al. | |
| 6,572,295 B1 | 6/2003 | Chochoy et al. | |
| 6,881,477 B2 * | 4/2005 | Presenz et al. ................. | 428/357 |
| 6,943,231 B2 | 9/2005 | Bühler | |
| 7,014,315 B2 | 3/2006 | Iori et al. | |
| 7,217,767 B2 * | 5/2007 | Aguirre et al. ................ | 525/191 |
| 7,249,844 B2 | 7/2007 | Sakai | |
| 7,258,929 B2 * | 8/2007 | Kanda et al. ............. | 428/474.4 |
| 7,427,430 B2 * | 9/2008 | Rhee et al. .................... | 428/35.7 |
| 7,723,411 B2 | 5/2010 | Schneider | |
| 7,807,245 B2 * | 10/2010 | Bersted et al. ............. | 428/36.91 |
| 7,807,742 B2 * | 10/2010 | Tanaka et al. ................. | 524/404 |
| 7,811,671 B2 * | 10/2010 | Bushelman et al. ....... | 428/474.4 |
| 7,981,518 B2 * | 7/2011 | Sato ........................... | 428/474.4 |

(Continued)

FOREIGN PATENT DOCUMENTS

| | | |
|---|---|---|
| CA | 2019904 | 1/1952 |
| CA | 861620 | 1/1971 |

(Continued)

OTHER PUBLICATIONS

U.S. Appl. No. 10/536,494, filed Oct. 5, 2006.
U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/186,785, filed Jul. 20, 2011.
U.S Appl. No. 10/536,494, filed Oct. 5, 2006.
U.S. Appl. No. 13/421,541, filed Mar. 15, 2012.
U.S. Appl. No. 13/481,451, filed May 25, 2012.
European Patent Office, Extended European Search Report in European Patent Application No. 10002658.2 (Aug. 3, 2010).
"Biax, ein neuer Prüfkörper" (Biax, a new inspection piece), published in Noss'Ovra staff magazine, Dec. 2006, No. 12, 29th year, EMS-CHEMIE AG (4 pgs.).
Cramer et al., "Some Isomorphous Copolyamides," *Journal of Polymer Science*, vol. 21, pp. 237-250 (1956).

(Continued)

*Primary Examiner* — Michele L Jacobson
(74) *Attorney, Agent, or Firm* — Leydig, Voit & Mayer, Ltd.

(57) ABSTRACT

Disclosed is an impact-resistant modified polyamide molding compound which is suitable in particular for the production of containers having a good oxygen barrier and low-temperature impact strength. Also disclosed are containers which are produced from the thermoplastic polyamide molding compound. In particular, storage or transport containers for industrial chemicals, agrochemicals, the cosmetic industry, pharmaceutical industry or foodstuffs industry can be produced from the polyamide molding compound of the invention.

18 Claims, No Drawings

U.S. PATENT DOCUMENTS

| | | | |
|---|---|---|---|
| 8,022,170 B2 | 9/2011 | Hoffman et al. | |
| 2001/0007888 A1 | 7/2001 | Asano | |
| 2003/0018107 A1 | 1/2003 | Heinen et al. | |
| 2003/0023008 A1 | 1/2003 | Uchida et al. | |
| 2003/0126788 A1 | 7/2003 | Uang et al. | |
| 2003/0181585 A1* | 9/2003 | Handlin et al. | 525/88 |
| 2003/0235666 A1 | 12/2003 | Bühler | |
| 2004/0158028 A1 | 8/2004 | Bühler | |
| 2004/0230028 A1* | 11/2004 | Sato et al. | 528/347 |
| 2005/0049339 A1 | 3/2005 | Knop et al. | |
| 2005/0101708 A1 | 5/2005 | Knop et al. | |
| 2006/0138391 A1 | 6/2006 | Drewes et al. | |
| 2006/0235190 A1 | 10/2006 | Hoffman et al. | |
| 2006/0264542 A1 | 11/2006 | Schneider | |
| 2007/0072970 A1 | 3/2007 | Schneider | |
| 2007/0104971 A1 | 5/2007 | Wursche et al. | |
| 2007/0123632 A1 | 5/2007 | Rexin et al. | |
| 2007/0172614 A1* | 7/2007 | Lee | 428/35.7 |
| 2007/0222941 A1 | 9/2007 | Sakai | |
| 2007/0270544 A1 | 11/2007 | Bühler et al. | |
| 2008/0135720 A1 | 6/2008 | Bühler et al. | |
| 2008/0207782 A1 | 8/2008 | Jacobs et al. | |
| 2008/0274355 A1* | 11/2008 | Hewel | 428/402 |
| 2009/0127740 A1 | 5/2009 | Kirchner | |
| 2009/0247699 A1* | 10/2009 | Buehler et al. | 525/64 |
| 2010/0022742 A1 | 1/2010 | Bühler et al. | |
| 2010/0130677 A1* | 5/2010 | Amici et al. | 524/606 |
| 2010/0227122 A1 | 9/2010 | Kumazawa et al. | |
| 2010/0279111 A1 | 11/2010 | Philipp et al. | |
| 2010/0297373 A1 | 11/2010 | Thullen et al. | |
| 2011/0105655 A1 | 5/2011 | Harder et al. | |
| 2012/0029133 A1* | 2/2012 | Stoppelmann et al. | 524/442 |
| 2012/0237708 A1* | 9/2012 | Caviezel et al. | 428/36.5 |
| 2012/0321829 A1* | 12/2012 | Bayer et al. | 428/36.9 |

FOREIGN PATENT DOCUMENTS

| | | |
|---|---|---|
| CH | 280367 | 1/1952 |
| DE | 24 47 727 A1 | 4/1976 |
| DE | 26 42 244 A1 | 3/1977 |
| DE | 36 00 015 A1 | 7/1986 |
| DE | 40 05 894 A1 | 12/1991 |
| DE | 43 29 676 A1 | 3/1994 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59 048 A1 | 7/2004 |
| DE | 103 16 873 A1 | 11/2004 |
| DE | 103 46 326 A1 | 5/2005 |
| DE | 694 28 832 T3 | 2/2007 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 792 912 A2 | 9/1997 |
| EP | 0 818 491 A2 | 1/1998 |
| EP | 0 837 087 A1 | 4/1998 |
| EP | 0 771 846 B1 | 1/2002 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | 05-125184 A | 5/1993 |
| JP | 06-511281 T | 12/1994 |
| JP | 08-239469 A | 8/1996 |
| JP | 08-259808 A | 10/1996 |
| JP | 09-078351 A | 3/1997 |
| JP | 10-168183 A | 6/1998 |
| JP | 10-219026 | 8/1998 |
| JP | 2001-261973 | 9/2001 |
| JP | 2004-083858 | 3/2004 |
| JP | 2006-045390 | 2/2006 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2006/074934 A1 | 7/2006 |
| WO | WO 2007/080754 A1 | 7/2007 |
| WO | WO 2007/087896 A1 | 8/2007 |
| WO | WO 2009/062692 A2 | 5/2009 |

OTHER PUBLICATIONS

Dolden, "Structure-property relationships in amorphous polyamides," *Polymer*, vol. 17, pp. 875-892 (1976).

Edgar et al., "The p-Phenylene Linkage in Linear High Polymers: Some Structure-Property Relationships," *Journal of Polymer Science*, vol. 8, No. 1, pp. 1-22 (1952).

Henkel Corporation, "Empol Dimer and Polybasic Acids: Technical Bulletin 114C," (1997).

Laura et al., "Effect of rubber particle size and rubber type on the mechanical properties of glass fiber reinforced, rubber-toughened nylon 6," *Polymer*, vol. 44, No. 11, pp. 3347-3361 (2003).

Levine et al., "Isomorphous Replacement in a Copolyamide System," *Journal of Polymer Science*, Issue XLIX, pp. 241-246 (1961).

Yu et al., "Isomorphous Replacement in a Copolyamide System: Homologs of Adipic and Terephthalic Acids," *Am. Chem. Soc.*, Issue 81, pp. 5361-5365 (1959).

* cited by examiner

IMPACT-RESISTANT MODIFIED POLYAMIDE MOULDING COMPOUND AND CONTAINER FORMED THEREFROM

CROSS-REFERENCE TO RELATED APPLICATION

The present application claims the benefit of European Patent Application No. 10 002 658.2, filed Mar. 12, 2010, the disclosure of which is incorporated by reference.

BACKGROUND OF THE INVENTION

The present invention relates to an impact-resistant modified polyamide moulding compound which is suitable in particular for the production of containers having a good oxygen barrier and low-temperature impact strength. Furthermore, the present invention relates to containers which are produced from the thermoplastic polyamide moulding compound. In particular, storage or transport containers for industrial chemicals, agrochemicals, the cosmetic industry, pharmaceutical industry or foodstuffs industry can be produced from the polyamide moulding compound according to the invention.

Modified polyamide moulding compounds which are suitable for the production of containers are already known from prior art. Thus EP 1 752 492 relates to a thermoplastic propellant barrier resin composition which, in addition to a polyamide, a modified polyolefin or a styrene copolymer, essentially consists of a polyolefin.

EP 1 942 296 discloses a multilayer hydraulic pipe having a layer made of a blend of polyamide 610 as main component, an amorphous or microcrystalline polyamide based on MXDA or PXDA and an impact modifier.

The high content of polyolefins or polyamide 610 in such resin compositions causes however a low oxygen barrier and, in the case of the polyolefin, has in addition a disadvantageous effect on the notch-impact strength and the result of the Gelbo Flex test of the resins.

BRIEF SUMMARY OF THE INVENTION

In this respect, the object of the present invention is to provide a polyamide composition which has excellent oxygen barrier properties and has good mechanical properties.

This object is achieved by the features of the moulding compound, the container, and the uses described herein.

According to the invention, a thermoplastic polyamide moulding compound is hence provided, which comprises
a) 71 to 89% by weight of a copolyamide MXD6/MXDI, the molar proportion of isophthalic acid, relative to the total quantity of the diacids, isophthalic acid and adipinic acid, being 1 to 30% by mol,
b) 11 to 29% by weight of at least one acid-modified copolyolefin elastomer or of at least one acid-modified blend of a plurality of copolyolefin elastomers, and also
c) 0 to 8% by weight of additives,
components a) to c) adding up to 100% by weight.

DETAILED DESCRIPTION OF THE INVENTION

The polyamide moulding compound according to the invention hence consists essentially of a copolyamide MXD6/MXDI matrix in which an acid-modified copolyolefin elastomer or a blend of a plurality of copolyolefin elastomers is compounded. According to the invention, no further polymers are understood by additives.

The polyamide moulding compound according to the invention concerns an impact-resistant modified polyamide moulding compound for the production of low-temperature impact-resistant containers having an excellent oxygen barrier.

Surprisingly, it was able to be shown that the polyamide moulding compound according to the invention has a low water vapour permeability and a high solvent barrier, e.g. relative to N-methylpyrrolidone, dimethyl sulphoxide or xylene.

In addition, it was found surprisingly that the barrier material, despite the modification with the copolyolefin elastomer which has per se a poor oxygen barrier, maintains its barrier effect virtually unchanged and that containers produced therefrom in addition withstand the drop test from at least 1.8 m height, i.e. also display excellent mechanical stability.

For the production of the polyamide moulding compound, the modified copolyolefin elastomer is mixed with the copolyamide to form a dry blend. This dry blend can either be extruded for further homogenisation and thereafter be processed or directly processed. The dry blend is preferably extruded first and then processed.

There should be understood by the acid-modified blend of a plurality of copolyolefin elastomers, a mixture of the components ethylene-propylene copolymer, ethylene-but-1-ene copolymer, propylene-but-1-ene copolymer, polyethylene and/or polypropylene. The mixture is homogenised in the melt, also the acid modification is thereby effected by grafting so that the modification degree is 0.3 to 1.5% by weight, preferably 0.4 to 1.2% by weight, particularly preferred 0.4 to 1.0% by weight, relative to the mixture.

If the mixture of the copolyolefin elastomers is used as dry blend, i.e. without homogenisation in the melt, then at least a part of the components is already acid-modified, e.g. to such an extent that the modification degree of the total dry blend is 0.3 to 1.5% by weight, preferably 0.4 to 1.2% by weight, particularly preferred 0.4 to 1.0% by weight. Such a dry blend can possibly also be homogenised in addition in the melt.

The choice of polyamide moulding compound is effected on the basis of the oxygen barrier (above all in the case of high air humidity), Gelbo Flex value and the notch-impact (above all at low temperature). The breaking elongation is possible also as criterion for the toughness. Hence the moulding compound according to the invention can be adapted or coordinated optimally to prevailing external conditions or predetermined requirements.

In a preferred embodiment, 0.2 to 4% by weight of additives can be added to the polyamide composition. For further preference, the quantity of each individual additive is thereby at most 3% by weight.

The additive is preferably selected from the group consisting of inorganic stabilisers, organic stabilisers, internal lubricants, colour and marking materials, inorganic pigments, organic pigments, antistatic agents, conductivity additives, carbon black, graphite, carbon nanotubes, optical brighteners, low-molecular compatibility agents, particulate fillers, in particular nanoscale fillers, such as e.g. minerals with a particle size of at most 100 nm or unmodified or modified natural or synthetic phyllosilicates or mixtures thereof.

There can be used as stabilisers or age-protecting agents in the polyamide compositions according to the invention, for example antioxidants, antiozonants, light stability agents, UV stabilisers, UV absorbers or UV blockers.

The particulate fillers are preferably selected from the group consisting of minerals, talcum, mica, dolomite, silicates, quartz, titanium dioxide, wollastonite, kaolin, silicic acids, magnesium carbonate, magnesium hydroxide, chalk, ground glass, glass flakes, ground carbon fibres, ground or precipitated calcium carbonate, lime, feldspar, barium sulphate, glass balls, hollow glass balls, hollow ball silicate fillers, synthetic layer silicates, natural layer silicates and mixtures hereof.

The particulate fillers can be surface-treated. This can take place with a suitable sizing or adhesive system. For this purpose, systems based on fatty acids, waxes, silanes, titanates, polyamides, urethanes, polyhydroxyethers, epoxides, nickel or respectively combinations or mixtures thereof can be used.

In the polyamide compositions according to the invention, there can be used as phyllosilicates, for example kaolins, serpentines, talcum, mica, vermiculites, muscovites, illites, smectites, saponites, montmorillonite, hectorite, double hydroxides or mixtures thereof. The layer silicates can be surface-treated (modified) but also untreated (unmodified).

In the polyamide compositions according to the invention, there can be used as antistatic agents and/or conductivity additives, for example carbon black and/or carbon nanotubes, also termed carbon nanofilaments.

The use of carbon black can serve for example for colouring the polyamide compositions black.

A preferred embodiment of the thermoplastic polyamide moulding compound provides that the molar proportion of isophthalic acid in the copolyamide MXD6/MXDI, relative to the total quantity of the diacids, isophthalic acid and adipinic acid, is 1 to 20% by mol, preferably 2 to 15% by mol, particularly preferred 2 to 12% by mol.

Furthermore, it is preferred that the at least one acid-modified copolyolefin elastomer or the at least one acid-modified blend of a plurality of copolyolefin elastomers is composed of monomeric units which are selected from the group consisting of ethylene d), propylene e) and but-1-ene f), the above-mentioned monomers being used preferably in the following molar proportions:

d) ethylene: 65-90% by mol, preferably 65-87% by mol, particularly preferred 71-84% by mol,
e) propylene: 8-33% by mol, preferably 10-25% by mol, particularly preferred 12-20% by mol, and also
f) but-1-ene: 2-25% by mol, preferably 3-20% by mol, particularly preferred 4-15% by mol, very particularly preferred 4-9% by mol, and components d) to adding up to 100% by mol.

According to this embodiment, it can hence by provided that the copolyolefin elastomer comprises the mentioned monomers d) to 0 in the indicated preferred molar proportions, however the possibility is likewise included that a plurality of copolyolefin elastomers are mixed which respectively comprise two of the monomers d) to f), i.e. d) and e), d) and 0 or e) and 0, so that the monomers d) to 0 are present in the mixture in the preferred molar proportions. For particular preference, the mixture consists of a copolyolefin elastomer of the monomers d) and e) and a copolyolefin elastomer of the monomers d) and so that the monomers d) to 0 are present in the mixture in the preferred molar proportions.

Furthermore, it is advantageous that the acid modification of the copolyolefin elastomer or of the blend of a plurality of copolyolefin elastomers is effected by grafting with unsaturated carboxylic acids and/or unsaturated carboxylic acid derivatives, preferably a carboxylic acid derivative selected from the group consisting of unsaturated carboxylic acid esters and unsaturated carboxylic acid anhydrides, in particular with an unsaturated carboxylic acid selected from the group consisting of acrylic acid, methacrylic acid, alpha-ethylacrylic acid, maleic acid, fumaric acid, itaconic acid, citraconic acid, aconitic acid, tetrahydrophthalic acid and/or butenylsuccinic acid, i.e. that the copolyolefin elastomer comprises grafted-on unsaturated carboxylic acids and/or unsaturated carboxylic acid derivatives in the molecule. The conditions under which the grafting of the copolyolefin elastomer takes place are adequately known to the person skilled in the art.

Advantageous degrees of modification, i.e. the weight proportions of the unsaturated carboxylic acids and/or unsaturated carboxylic acid derivatives in the copolyolefin elastomers or the blend of a plurality of copolyolefin elastomers are thereby 0.3 to 1.5% by weight, preferably 0.4 to 1.2% by weight, particularly preferred 0.4 to 1.0% by weight.

A particularly preferred embodiment of the invention provides that the relative viscosity of the copolyamide MXD6/MXDI, measured in 0.5% by weight of m-cresol solution at 20° C., is 1.40 to 1.80, preferably 1.46 to 1.73, particularly preferred 1.51 to 1.69, very particularly preferred 1.53 to 1.66.

Preferably, the copolyamide MXD6/MXDI has at most 70 meq/kg, particularly preferred 5 to 50 meq/kg, very particularly preferred 10 to 29 meq/kg amino end groups.

Preferably, a copolyamide MXD6/MXDI with 5 to 50 meq/kg amino end groups is combined with copolyolefin elastomers or with a blend of a plurality of copolyolefin elastomers with a modification degree of 0.4 to 1.2% by weight.

For particular preference, a copolyamide MXD6/MXDI with 10 to 29 meq/kg amino end groups is combined with copolyolefin elastomers or a blend of a plurality of copolyolefin elastomers with a modification degree of 0.4 to 1.0% by weight.

Particularly good mechanical properties can be achieved if
a) the weight proportion of the copolyamide in the polyamide moulding compound is 73 to 87% by weight, preferably 75 to 85% by weight, particularly preferred 77 to 83% and/or
b) the weight proportion of the at least one acid-modified copolyolefin elastomer in the polyamide moulding compound or of the at least one acid-modified blend of a plurality of copolyolefin elastomers in the polyamide moulding compound is 13 to 27% by weight, preferably 15 to 25% by weight, particularly preferred 17 to 23% by weight.

The polyamide moulding compound according to the invention is distinguished in particular in that, in addition to the copolymers a) and b), no further polymers and/or copolymers are contained.

The polyamide moulding compound according to the invention is not transparent.

In an alternative embodiment, the polyamide moulding compound according to the invention consists of components a) to c), no further polymers being understood according to the invention under c).

For production of the polyamide moulding compound according to the invention, the components a) and b), possibly the components a) to c), are mixed in the molten state. This takes place in normal compounding machines, such as e.g. single- or twin-shaft extruders or screw kneaders. The components are thereby metered individually into the feed or supplied in the form of a dry blend.

For the dry blend production, the dried granulates and possibly further additives (supplements) are mixed in. This mixture is homogenised by means of a tumble mixer, eccentric wheel mixer or tumble drier for 10 to 40 minutes. This can be effected under dry protective gas in order to avoid moisture absorption.

The compounding is effected at set cylinder temperatures of 220 to 300° C. and a set temperature of the feed zone of 70 to 120° C. A vacuum can be applied in front of the nozzle or be degassed atmospherically. The melt is discharged in extruded form, cooled in the water bath at 10 to 80° C. and subsequently granulated. The granulate is dried for 12 to 24 hours at 80 to 120° C. under nitrogen or in the vacuum to a water content of below 0.1% by weight, preferably of below 0.05% by weight.

According to the invention, an opaque multilayer container is likewise provided, in which at least one layer is produced from a moulding compound according to the invention, described above. This layer can concern an intermediate layer or the inner layer. In the container, also a plurality of polyamide moulding compound layers can be contained. Preferably, the polyamide moulding compound layer forms the innermost layer of the container, i.e. the layer which directly delimits the interior of the container. The inner layer is hence in direct contact with the filled goods. The preferred type of this container is hence for example a storage vessel, barrel, canister, bottle or pipe or the like. Preferably, rigid containers are concerned. With respect to its geometric dimensions, the container is not restricted, thus within the term in "container" there are included according to the invention, for example canisters, tanks or similar sealable vessels, but also pipes.

The container preferably has three to seven layers.

Preferably, the container has at least one layer made of a polyolefin.

The term polyolefin in this context comprises, in addition to homopolyolefins, also copolyolefins, grafted polyolefins, grafted copolyolefins, ionomers and copolymers made of olefins with acrylic acid, acrylic acid derivatives (e.g. methacrylic acid, acrylonitrile, methacrylic acid methyl ester, methacrylic acid butyl ester, glycidyl methacrylate etc.), vinyl acetate, maleic anhydride, further olefins and/or styrene.

The preferred layer thicknesses of the at least one layer of the container which is produced from the moulding compound according to the invention are thereby 15 to 800 preferably 20 to 500 μm, particularly preferred 25 to 250 μm, very particularly preferred 30 to 150 μm.

By using the moulding compound according to the invention for the production of at least one layer of the container, the container can be endowed surprisingly at the same time with good mechanical properties and also a very good oxygen barrier.

Preferred wall thicknesses of the container, i.e. the total quantity of all the layers from which the container is formed, are thereby 500 μm to 10 mm, preferably 600 μm to 6 mm, particularly preferred 700 μm to 3 mm.

With respect to the containers according to the invention, there is no particular preferred limit with respect to the capacity, the above-discussed advantageous effects come to fruition however in particular with a capacity of 0.5 to 220 l, preferably of 0.5 to 80 l, further preferred of 0.75 to 20 l, particularly preferred of 1 to 5 l.

In the case of containers with a volume of 1 to 5 l, the wall thickness is preferably 700 μm to 2.5 mm, particularly preferred 900 μm to 1.8 mm. The layer thickness of the at least one layer which is produced from the moulding compound according to the invention is, in these containers, preferably 25 μm to 250 μm, particularly preferred 35 μm to 120 μm.

In the case of containers with a volume of 80 to 220 l, the wall thickness is preferably 2.5 mm to 10 mm, particularly preferred 2.5 mm to 6 mm. The layer thickness of the at least one layer which is produced from the moulding compound according to the invention is, in these containers, preferably 80 μm to 800 μm, particularly preferred 80 μm to 400 μm.

The wall thickness, i.e. the totality of all the layers from which the container is formed and the layer thickness of the at least one layer which is produced from the moulding compound according to the invention is measured at a cut through the container at half the height, and in fact at four positions which are at a distance from each other by respectively 90°. In the case of square containers, these four positions are preferably in the middle of the side surfaces. The wall thickness can be determined at these places directly or by means of a microtome cut. The layer thickness of the at least one layer which is produced from the moulding compound according to the invention is determined by means of a microtome cut. The measurement is effected on three containers. The indicated values concern the arithmetic mean of these 12 measuring values.

Examples of the layer structure of a container are:
3-layer container:
PO/HV/PA
PO+regranulate/HV/PA
4-layer container:
PO/regranulate/HV/PA
PO/PO+regranulate/HV/PA
5-layer container:
PO/regranulate/PO/HV/PA
PO/HV/PA/HV/PO
6-layer container:
PO/regranulate/HV/PA/HV/PO
PO/regranulate/HV/PA/HV/PO
7-layer container:
PO/HV/PA/HV/PO/HV/PA
PO/PO+regranulate/HV/PA/HV/PO+regranulate/PO
PO/regranulate/HV/PA/HV/regranulate/PO
PO polyolefin
HV adhesive
PA polyamide moulding compound according to the invention Between a polyolefin layer and a polyamide layer, preferably an adhesive layer is always used. Commercially available adhesives or adhesive concentrates thereby serve as adhesives. In the case of containers up to 20 l, the adhesive can also be mixed into the polyolefin layer, the proportion of which in this layer is then 10 to 50% by weight, preferably 15 to 25% by weight.

Each polyolefin layer which is situated at the outside or is embedded can comprise regranulate, and in fact up to 70% by weight, preferably up to 50% by weight, particularly preferred up to 40% by weight. There should thereby be understood by regranulate, the material residues occurring during the container production, such as e.g. start-up material, knock-outs or reject containers which are comminuted before the addition. The regranulate can also be used as a separate layer.

The containers according to the invention are distinguished by extremely high mechanical stability, which is made clear with reference to a test. The container according to the invention is thereby filled with an ethylene glycol-water mixture in the volume ratio of 1:2 and stored for 24 h to 48 h at −20° C. The containers according to the invention, which are filled with such a solvent mixture and tempered, do not however break surprisingly with a drop from 1.8 m, preferably from 2.0 m, particularly preferred from 2.2 m height.

Purposes of use of the containers according to the invention are in particular the production of containers for agrochemicals (e.g. herbicides, pesticides, fungicides, fertilisers), industrial chemicals, industrial precursor and intermediate products, cosmetic precursor products or products (e.g. solvents, aromatic solutions, mascara, nail polish), pharmaceutical precursor products or products and/or precursor products for the foodstuffs industry (e.g. flavourings, additives).

In the case of agrochemicals, of concern are containers for end consumers. In the case of industrial chemicals, containers for end users and the business-to-business sphere. In the case of other uses, containers for the business-to-business sphere.

The preferred application of the polyamide moulding compounds according to the invention are containers (EBM- or ISBM containers) produced by extrusion blow-moulding or injection stretch blow-moulding with a volume of 0.5 l to 20 l. The polyamide moulding compound layer can thereby be used as intermediate layer or inner layer. Also a plurality of polyamide moulding compound layers can be contained.

Containers with a volume of 0.5 l to 20 l are produced via extrusion blow-moulding or injection stretch blow-moulding. Larger containers are preferably manufactured by means of extrusion blow-moulding.

The processibility to form flat films and the properties thereof are very relevant for the application of the polyamide moulding compounds according to the invention since the at least one layer made of the polyamide moulding compound according to the invention in the container can achieve merely film thickness, according to the size of the container.

The advantageous properties which are associated with the moulding compound according to the invention are explained further with reference to the following examples without wishing to restrict the invention hereto. The compounds used in tables 2 to 6 are indicated in the subsequent table 1.

The water vapour permeability of the polyamide moulding compound according to the invention of examples 1, 2 and 4 (measured on flat films of thickness 50 μm at 23° C. and 85% relative humidity) are:

| | |
|---|---|
| Example 1 | 6.5 g/m² d |
| Example 2 | 6.4 g/m² d |
| Example 4 | 6.7 g/m² d |

The following measuring specifications are used to test the polyamide moulding compounds.

Relative Viscosity
ISO 307
0.5% by weight of m-cresol solution
or for PA 6 1.0% by weight solution in 96% sulphuric acid temperature 20° C.
calculation of the relative viscosity (RV) according to $RV = t/t_0$ following section 11 of the standard.

Melting Point
ISO standard 11357-1/-2
Granulate
Differential scanning calorimetry (DSC) was implemented with a heating rate of 20 K/min.
The temperature at peak maximum is indicated as melting point.

Amino End Group Determination
For determination of the amino end groups, the polyamide is dissolved hot in m-cresol and mixed with isopropanol. The content of amino end groups is determined by potentiometric titration with perchloric acid.

Modulus of Elasticity in Tension:
ISO 527 with a tensile speed of 1 mm/min
ISO tensile bar, standard: ISO/CD 3167, type A1, 170×20/10×4 mm, temperature 23° C.

Breaking Elongation:
ISO 527 with a tensile speed of 50 mm/min
ISO test bar, standard: ISO/CD 3167, type A1, 170×20/10×4 mm, temperature 23° C.

Impact Strength According to Charpy:
ISO 179/*eU
ISO test bar, standard: ISO/CD 3167, type B1, 80×10×4 mm, temperature 23° C. or −30° C.
*1=non-instrumented, 2=instrumented Notch-Impact Strength According to Charpy:
ISO 179/*eA
ISO test bar, standard: ISO/CD 3167, type B1, 80×10×4 mm, temperature 23° C. or −30° C.
*1=non-instrumented, 2=instrumented Oxygen Barrier Measurement
ASTM D 3985-5
Flat film, thickness 50 μm
Temperature and relative humidity corresponding to the data in the tables Measuring device Mocon OX-Tran 2/20 by the Mocon company. Calibration of the measuring device is implemented with a polyester calibration film "Juliett" with 0.95 mil (24.13 μm) thickness by the Mocon Company. The measurement is effected by the carrier gas process.

Determination of the Water Vapour Permeability
DIN 53122-1
Flat film, thickness 50 μm, diameter approx. 90 cm
Test conditions 23° C., 85% relative air humidity
An aluminium dish which is filled with approx. 150 g silica gel as absorption agent is sealed by the sample by means of a screwed-on clamping ring and inserted in the desiccator. The water vapour volume which penetrates through the test surface of the sample surface and is absorbed by the absorption agent is determined from the increase in mass of the dish weighed every 24 h. The increase in mass is tracked over 28 days.

Gelbo Flex Test
ASTM F 392
Flat film, DIN A4, thickness 50 μm
Stroke 155 mm
Angle of rotation 440°
Speed 45 cycles/min
Temperature 23° C.
Measuring device Gelbo Flex Tester Model G0002 by the company IDM Instruments. The measurement is effected at 900 cycles. In order to count the holes produced in the film, the flexed film is placed on a filter paper and both are fixed by a frame on a perforated plate. The perforated plate is subjected to a water jet vacuum and subsequently ink is distributed on the film with a sponge or paint brush. The holes become visible as coloured markings on the filter paper and can be counted. The number of holes is indicated per m². The value indicated in the tables represents the arithmetic mean from 5 measurements.

Drop Test
ADR/RDI 2009 section 6.1
3-layer bottle with the following layer thicknesses from outside to inside 1350/40/65 μm and a volume of 1 l Filled goods water/ethyleneglycol 2/1
Temperature −20° C.
The bottles (10 items per drop height) are stored for 24 to 48 h at −18° C. and tested immediately after removal. In order to withstand the drop height, all 10 bottles must still be impermeable after the test.
Determination of the Solvent Barrier
3-layer bottle with the following layer thicknesses from outside to inside 1350/40/65 μm and a volume 1 l
Filled goods N-methylpyrrolidone
Temperature 40° C.
Storage duration 60 days
The storage is effected in a circulating air drying cupboard in a well-ventilated room. Respectively 5 bottles are tested. The weight loss is determined after 30, 40, 50 and 60 days.

The test pieces for the tensile and impact tests were produced on an injection moulding machine by the Arburg Company, Model Allrounder 420 C 1000-250. Increasing cylinder temperatures from 265° C. to 285° C. were thereby used. The moulding temperature was 80° C. The test bodies were used in the dry state, they were stored for this purpose after the injection moulding for at least 48 h at room temperature in a dry environment, i.e. over silica gel.

Flat-film production (thickness 50 μm) was effected on a Collin flat-film unit with a 3-zone screw (diameter 30 mm) at cylinder temperatures from 240 to 260° C. and a head and nozzle temperature of respectively 260° C. The cooling roller temperature was 15° C. with a tool width of 300 mm and a tool exit gap mass of 0.7 mm. The 50 μm thick flat films are translucent.

The production of 3-layer bottles was effected on a Bekum double station blowing unit with three extruders. In the case of the extruder for the polyamide moulding compound according to the invention, cylinder temperatures of 245/255/255° C. and a nozzle temperature of 245° C. were set. For the processing of the impact-strength modified PA6, cylinder temperatures of 245/245/245° C. and a nozzle temperature of 235° C. were used. The other extruders were operated corresponding to the recommendations of the material manufacturers. The mould temperature was 20° C. The bottle weight was 105 g.

Layer structure of the bottle:
Outer layer/HV/inner layer
with the following layer thicknesses 1350/40/65 μm.
As outer layer, either a mixture of HDPE (65% by weight) and regranulate (35% by weight) or HDPE alone (100% by weight) was used.
As inner layer, the polyamide moulding compound according to the invention of example no. 2, an impact-strength modified polyamide 6 or EVOH, was used.
HDPE: type HDPE B5823 by Sabic
(MFI 23 at 190° C. and 21.6 Kg)
HV: type Admer NF 408 E by Mitsui
(MFI 1.6 at 190° C. and 21.6 kg)
PA6, impact-strength modified
80% by weight of PA6 (RV 2.75, in Sulphuric Acid)
20% by weight of Tafiner MC 201
(oxygen permeability at 23° C.:
50% rF 50 ccm/$m^2$ d bar
85% rF 80 ccm/$m^2$ d bar
water vapour permeability at 23° C., 85% rF:
13 g/$m^2$ d)
EVOH: type EVAL F 101 B from Kuraray
(32% by mol of PE, MFI 1.6 at 190° C. and 2.16 kg)
Production Example for the Polyamide Compositions In the following, the production of a PA moulding compound according to the invention is explained with reference to the moulding compound of example no. 2, the further examples and comparative examples were produced analogously.

The moulding compound was produced on a twin-screw extruder by the company Werner & Pfleiderer type ZSK 25. For the dry blend production, the dried granulates (copolyamide and copolyolefin) are mixed. This mixture is homogenised by means of a tumble mixer for 30 minutes. The dry blend was metered into the feed by means of scales.

The temperature of the first cylinder was set to 100° C., that of the remaining cylinders increasing from 230 to 300° C. A speed of rotation of 300 rpm and a throughput of 15 kg/h was used and degassed atmospherically. The strands were cooled in the water bath, cut and the obtained granulate dried at 120° C. for 24 h to a water content below 0.1% by weight.

Tables 2 and 3 show examples according to the invention, component b) being mixed from two olefin copolymers according to table 3.

Tables 4 to 6 contain comparative examples. Table 4 shows comparative examples with too low or too high a proportion of component b). Tables 5 and 6 are produced according to the initially cited state of the art.

Table 7 compiles the results of the drop test and of the determination of the solvent barrier.

Examples 1 to 11 concern examples according to the invention with polyamide moulding compounds comprising a copolyamide MXD6/MXDI and an acid-modified copolyolefin elastomer (Table 2) or an acid-modified blend of a plurality of copolyolefin elastomers (Table 3). They display low oxygen permeability with simultaneous low susceptibility to the formation of holes in the Gelbo Flex test. Also the impact-notch strengths are high.

The comparative examples 12 and 13 show that 10% by weight of the acid-modified copolyolefin elastomer (B1) in the PA MXD6/MXDI do not yet suffice since the film produced therefrom is destroyed in the Gelbo Flex test. Furthermore, only low notch-impact strengths are produced. On the other hand, 30% by weight of the acid-modified copolyolefin elastomer (B1) in the PA MXD6/MXDI is too much (comparative example 14) since the moulding compound then has so many gel particles that a film can no longer be produced.

Tables 5 and 6 (comparative examples 15 to 19) show further results obtained on polyamide moulding compounds which are not according to the invention. The polyamide moulding compounds of table 5 are thereby produced according to EP 1 752 492 A1 and those of table 6 according to EP 1 942 296 A1.

The moulding compounds produced in the comparative examples 15 and 16 according to EP 1 752 492 A1 have too many gel particles so that a film can no longer be produced (comparative example 15) or they have too high an oxygen permeability and too little toughness (comparative example 16).

The moulding compounds produced in the comparative examples 17 to 19 according to EP 1 942 296 A1 have altogether too high oxygen permeabilities.

In table 7, the results of the drop test with filled and cooled 3-layer bottles are reproduced. The bottles with the inner layer made of the moulding compound according to example no. 2 of the invention withstand a drop from 2.20 m height and hence display the best result of all the tested bottles.

The bottles with the impact-resistant modified polyamide 6 as inner layer in fact withstand a drop from 1.80 m height but the impact-resistant modified polyamide 6 has a substantially higher oxygen permeability than the moulding compounds according to the invention.

Furthermore, the bottles with the impact-modified polyamide 6 as inner layer display a poorer barrier relative to N-methylpyrrolidone than bottles with the moulding compound according to example no. 2 of the invention as inner layer.

EVOH concerns a current barrier material, also for bottles. Bottles with EVOH as inner layer only achieve drop heights of 1.40 m or of less than 1.0 m respectively according to the outer layer.

TABLE 1

| Components | Description | Functionalisation: Type Quantity | Density g/ccm | MFR 230° C. 2.16 kg | Trade name | Manufacturer |
|---|---|---|---|---|---|---|
| PA MXD6/MXDI (A1) | Copolyamide MXD6/MXDI made of meta-xylylenediamine, adipinic acid and isophthalic acid, with 2% by mol isophthalic acid, relative to 100% by mol diacid RV 1.63 (measured in 0.5% by wt. m-cresol solution at 20° C.) melting point 234° C., amino end groups 19 meq/kg | — — | — | — | — | EMS-CHEMIEAG, Switzerland |
| PA MXD6/MXDI (A2) | Copolyamide MXD6/MXDI made of meta-xylylenediamine, adipinic acid and isophthalic acid, with 12% by mol isophthalic acid, relative to 100% by mol diacid RV 1.56 (measured in 0.5% by wt. m-cresol solution at 20° C.) melting point 218° C., amino end groups 46 meq/kg | — — | — | — | — | EMS-CHEMIEAG, Switzerland |
| PA610 | Polyamide 610 made of hexamethylenediamine and sebacic acid RV 1.95 (measured in 0.5% by wt. m-cresol solution at 20° C. | — — | — | — | — | EMS-CHEMIEAG, Switzerland |
| PE-HD | Polyethylene with high density | — — | 0.945 | 15* | Lupolen 4261A | Lyondell Basell, Netherlands |
| E/P-E/B-MAH (B1) | Blend made of ethylene/propylene copolymer and ethylene/but-1-ene copolymer in the weight ratio 67:33 | Maleic anhydride 0.6% by wt. | 0.875 | 1.3 | Tafmer MC 201 | Mitsui Chemicals Japan |
| E/P-MAH (B2) | Functionalised olefin copolymer made of ethylene and propylene | Maleic anhydride 0.8% by wt. | 0.870 | — | Exxelor VA 1810 | Exxon Mobile Chemicals, USA |
| E/B-MAH (B3) | Functionalised olefin copolymer made of ethylene and but-1-ene | Maleic anhydride 0.8% by wt. | 0.870 | 1.8 | Tafmer MH 7010 | Mitsui Chemicals Japan |
| E-MAH (B4) | Olefin copolymer made of ethylene and maleic anhydride | Maleic anhydride 0.2% by wt. | 0.924*** | 1.1** | Admer GT 6 | Mitsui Chemicals Japan |

RV relative viscosity
*MFR 190° C., 21.6 kg
**MFR 190° C., 2.16 kg
***tempered 120° C., 1 h

TABLE 2

| Components | Unit | Examples Number | | | |
|---|---|---|---|---|---|
| | | 1 | 2 | 3 | 4 |
| PA MXD6/MXDI (A1) | % by wt. | 85 | 80 | — | 75 |
| PA MXD6/MXDI (A2) | % by wt. | — | — | 80 | — |
| E/P-E/B-MAH (B1) | % by wt. | 15 | 20 | 20 | 25 |
| Tests | | | | | |
| Modulus of elasticity in tension | MPa | 2700 | 2200 | 2170 | 1990 |
| Breaking elongation | % | 35 | 40 | 70 | 35 |
| Impact strength, Charpy | | | | | |
| 23° C. | kJ/m$^2$ | 330 | 350 | 315 | 315 |
| −30° C. | | 90 | 100 | 100 | 100 |
| Notch-impact strength, Charpy | | | | | |
| 23° C. | kJ/m$^2$ | 30 | 75 | 85 | 90 |
| −30° C. | | 10 | 13 | 15 | 15 |
| Oxygen permeability | | | | | |
| 0% rF, 23° C. | ccm/m$^2$ d bar | 11 | 11 | 12 | 14 |
| 50% rF, 23° C. | | 4 | 4 | 4 | 5 |
| 85% rF, 23° C. | | 4 | 5 | 5 | 6 |
| Gelbo Flex test, 900 cycles | holes | 238 | 98 | 94 | 63 |

TABLE 3

| Components | Unit | Examples Number | | | | | | |
|---|---|---|---|---|---|---|---|---|
| | | 5 | 6 | 7 | 8 | 9 | 10 | 11 |
| PA MXD6/MXDI (A1) | % by wt. | 80 | 80 | — | 80 | 80 | — | 80 |
| PA MXD6/MXDI (A2) | % by wt. | — | — | 80 | — | — | 80 | — |
| E/P-MAH (B2) | % by wt. | 16 | 13 | 13 | 10 | 7 | 7 | 4 |
| E/B-MAH (B3) | % by wt. | 4 | 7 | 7 | 10 | 13 | 13 | 16 |
| Tests | | | | | | | | |
| Modulus of elasticity in tension | MPa | 2200 | 2240 | 2200 | 2190 | 2130 | 2210 | 2210 |
| Breaking elongation | % | 45 | 60 | 35 | 35 | 50 | 40 | 40 |
| Impact strength, Charpy | | | | | | | | |
| 23° C. | kJ/m$^2$ | 310 | 305 | 315 | 305 | 305 | 320 | 310 |
| −30° C. | | 100 | 100 | 100 | 100 | 100 | 100 | 100 |
| Notch-impact strength, Charpy | | | | | | | | |
| 23° C. | kJ/m$^2$ | 25 | 40 | 35 | 65 | 75 | 30 | 65 |
| −30° C. | | 10 | 11 | 13 | 13 | 14 | 14 | 13 |
| Oxygen permeability | | | | | | | | |
| 0% rF, 23° C. | ccm/m$^2$ d bar | 11 | 13 | 12 | 13 | 11 | 13 | 13 |
| 50% rF, 23° C. | | 4 | 5 | 4 | 5 | 5 | 4 | 4 |
| 85% rF, 23° C. | | 6 | 6 | 5 | 6 | 5 | 6 | 5 |
| Gelbo Flex test, 900 cycles | holes | 138 | 112 | 108 | 115 | 115 | 110 | 138 |

TABLE 4

| Components | Unit | Comparative examples Number | | |
|---|---|---|---|---|
| | | 12 | 13 | 14 |
| PA MXD6/MXDI (A1) | % by wt. | 95 | 90 | 70 |
| E/P-E/B-MAH (B1) | % by wt. | 5 | 10 | 30 |
| Tests | | | | |
| Modulus of elasticity in tension | MPa | 3550 | 3110 | 1760 |
| Breaking elongation | % | 8 | 22 | 18 |
| Impact strength, Charpy | | | | |
| 23° C. | kJ/m$^2$ | 75 | 220 | 285 |
| −30° C. | | 60 | 70 | 100 |
| Notch-impact strength, Charpy | | | | |
| 23° C. | kJ/m$^2$ | 4 | 8 | 80 |
| −30° C. | | 4 | 5 | 16 |
| Oxygen permeability | | | | |
| 0% rF, 23° C. | ccm/m$^2$ d bar | 8 | 9 | * |
| 50% rF, 23° C. | | 3 | 3 | * |
| 85% rF, 23° C. | | 3 | 4 | * |
| Gelbo Flex test, 900 cycles | holes | ** | ** | * |

* too many gel particles, therefore no film producible
** film is torn

TABLE 5

| Components | Unit | Comparative examples Number | |
|---|---|---|---|
| | | 15 | 16 |
| PE HD | % by wt. | 50 | 75 |
| PA MXD6/MXDI (A1) | % by wt. | 25 | 5 |
| E-MAH (B9) | % by wt. | 25 | 20 |
| Tests | | | |
| Modulus of elasticity in tension | MPa | 1140 | 825 |
| Breaking elongation | % | 25 | 15 |

TABLE 5-continued

| | | Comparative examples Number | |
|---|---|---|---|
| Components | Unit | 15 | 16 |
| Impact strength, Charpy | | | |
| 23° C. | kJ/m² | 30 | 150 |
| −30° C. | | 19 | 100 |
| Notch-impact strength, Charpy | | | |
| 23° C. | kJ/m² | 10 | 1 |
| −30° C. | | 10 | 9 |
| Oxygen permeability | | | |
| 0% rF, 23° C. | ccm/m² d bar | * | 2080 |
| 50% rF, 23° C. | | * | 2043 |
| 85% rF, 23° C. | | * | 2000 |
| Gelbo Flex test, 900 cycles | holes | * | 1495 |

* too many gel particles, therefore no film producible

TABLE 6

| | | Comparative examples Number | | |
|---|---|---|---|---|
| Components | Unit | 17 | 18 | 19 |
| PA 610 | % by wt. | 75 | 55 | 50 |
| PA MXD6/MXDI (A1) | % by wt. | 20 | 30 | 30 |
| E/P-E/B-MAH (B1) | % by wt. | 5 | 15 | 20 |
| Tests | | | | |
| Modulus of elasticity in tension | MPa | 2450 | 2165 | 1985 |
| Breaking elongation | % | 30 | 40 | 65 |
| Impact strength, Charpy | | | | |
| 23° C. | kJ/m² | 360 | 305 | 285 |
| −30° C. | | 100 | 100 | 100 |
| Notch-impact strength, Charpy | | | | |
| 23° C. | kJ/m² | 10 | 30 | 55 |
| −30° C. | | 7 | 16 | 19 |
| Oxygen permeability | | | | |
| 0% rF, 23° C. | ccm/m² d bar | 84 | 83 | 73 |
| 50% rF, 23° C. | | 53 | 50 | 41 |
| 85% rF, 23° C. | | 60 | 60 | 48 |
| Gelbo Flex test, 900 cycles | holes | 432 | 292 | 230 |

TABLE 7

Drop test on filled and cooled 3-layer bottles, intermediate layer respectively made of Admer NF 408 E and barrier relative to N-methylpyrrolidone

| Material for outer layer | Material for inner layer | Highest withstood drop height [m] | Weight loss during storage at 40° C. for 60 days [g/d] |
|---|---|---|---|
| HDPE + regranulate | Example no. 2 | 2.20 | 0.017 |
| HDPE + regranulate | PA6, impact-resistant modified | 1.80 | 0.021 |
| HDPE + regranulate | EVOH | <1.00 | — |
| HDPE | EVOH | 1.40 | — |

The invention claimed is:

1. A thermoplastic polyamide moulding compound, comprising
   a) 71 to 89% by weight of a copolyamide MXD6/MXDI, the molar proportion of isophthalic acid, relative to the total quantity of the diacids, isophthalic acid and adipic acid, being 1 to 30% by mol,
   b) 11-29% by weight of at least one acid-modified copolyolefin elastomer or at least one acid-modified blend of a plurality of copolyolefin elastomers, comprising the following monomeric units in the following molar proportions:
      i) 65-90% by mol ethylene
      ii) 8-33% by mol propylene
      iii) 2-25% by mol but-1-ene, and
   c) 0 to 8% by weight of additives,
   components a) to c) adding up to 100% by weight.

2. The moulding compound according to claim 1, wherein the molar proportion of isophthalic acid in the copolyamide MXD6/MXDI, relative to the total quantity of the diacids, isophthalic acid and adipic acid, is 1 to 20% by mol.

3. The moulding compound according to claim 1, wherein the copolyamide MXD6/MXDI has at most 70 meq/kg amino end groups.

4. The moulding compound according to claim 1, wherein the modification degree of the acid-modified copolyolefin elastomer or of the at least one acid-modified blend of a plurality of copolyolefin elastomers is 0.3 to 1.5% by weight, relative to the acid-modified copolyolefin elastomer or the acid-modified blend of a plurality of copolyolefin elastomers.

5. The moulding compound according to claim 1, wherein the acid modification of the copolyolefin elastomer or of the blend of a plurality of copolyolefin elastomers is effected by grafting with unsaturated carboxylic acids and/or unsaturated carboxylic acid derivatives.

6. The moulding compound according to claim 1, wherein the relative viscosity of the polyamide MXD6/MXDI, measured in 0.5% by weight of m-cresol solution at 20° C., is 1.40 to 1.80.

7. The moulding compound according to claim 1, wherein
   a) the weight proportion of the copolyamide is 73 to 87% by weight, and
   b) the weight proportion of the at least one acid-modified copolyolefin elastomer or of the at least one acid-modified blend of a plurality of copolyolefin elastomers is 13 to 27% by weight, relative to the moulding compound.

8. The moulding compound according to claim 1, wherein, in addition to the copolymers a) and b), no further polymers and/or copolymers are contained and the moulding compound hence consists of components a) to c).

9. A multilayer container comprising at least one layer which is produced from a moulding compound according to claim 1.

10. The container according to claim 9, wherein at least the innermost layer is produced from the moulding compound.

11. The container according to claim 9, wherein the at least one layer which is produced from the moulding compound has a layer thickness of 15 to 800 μm.

12. The container according to claim 9, wherein the totality of the layers has a total layer thickness of 500 μm to 10 mm.

13. The container according to claim 9, which, when filled with an ethylene glycol-water mixture in the volume ratio of 1:2 and after storage at −20° C. for 24 to 48 hours, and dropped from 1.8 m, does not break.

14. A method for storing agrochemicals, industrial chemicals, industrial precursor and intermediate products, cosmetic precursor products or products, pharmaceutical precursor products or products and/or precursor products for the foodstuffs industry comprising utilizing the container according to claim 9.

15. The moulding compound of claim 2, wherein the molar proportion of isophthalic acid in the copolyamide MXD6/

MXDI, relative to the total quantity of the diacids, isophthalic acid and adipic acid, is 1 to 15% by mol.

16. The moulding compound according to claim 3, wherein the copolyamide MXD6/MXDI has at most 5 to 50 meq/kg amino end groups.

17. The moulding compound according to claim 4, wherein the modification degree of the acid-modified copolyolefin elastomer or of the at least one acid-modified blend of a plurality of copolyolefin elastomers is 0.4 to 1.2% by weight.

18. The moulding compound according to claim 5, wherein the carboxylic acid derivative is selected from the group consisting of unsaturated carboxylic acid esters and unsaturated carboxylic acid anhydrides.

* * * * *